(12) United States Patent
Miyoshi et al.

(10) Patent No.: US 11,381,694 B2
(45) Date of Patent: Jul. 5, 2022

(54) INFORMATION PROCESSING DEVICE, IMAGE FORMING DEVICE, AND NON-TRANSITORY COMPUTER READABLE MEDIUM

(71) Applicant: FUJIFILM BUSINESS INNOVATION CORP., Tokyo (JP)

(72) Inventors: Nobukazu Miyoshi, Kanagawa (JP); Shunji Tsunashima, Kanagawa (JP); Terutake Hayashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 185 days.

(21) Appl. No.: 16/564,645

(22) Filed: Sep. 9, 2019

(65) Prior Publication Data
US 2020/0099806 A1    Mar. 26, 2020

(30) Foreign Application Priority Data
Sep. 20, 2018    (JP) .............................. JP2018-175762

(51) Int. Cl.
*H04N 1/00*    (2006.01)
(52) U.S. Cl.
CPC ..... *H04N 1/00474* (2013.01); *H04N 1/00938* (2013.01); *H04N 2201/0094* (2013.01)
(58) Field of Classification Search
CPC ........... H04N 1/00474; H04N 1/00938; H04N 2201/0094
USPC ....................................................... 358/1.13
See application file for complete search history.

(56) References Cited

U.S. PATENT DOCUMENTS

| 9,124,731 | B2* | 9/2015 | Hirai | H04N 1/32507 |
| 9,588,727 | B2* | 3/2017 | Hirai | H04N 1/00938 |
| 10,142,507 | B2* | 11/2018 | Kawai | H04N 1/00938 |
| 2009/0323096 | A1* | 12/2009 | Oshima | G06Q 10/06 |
| | | | | 358/1.13 |
| 2012/0033257 | A1* | 2/2012 | Okazawa | H04N 1/00503 |
| | | | | 358/1.15 |

FOREIGN PATENT DOCUMENTS

| JP | 2006-107301 A | 4/2006 |
| JP | 2012-37928 A | 2/2012 |
| JP | 2016-5894 A | 1/2016 |
| JP | 2017-168959 A | 9/2017 |

OTHER PUBLICATIONS

May 10, 2022 Office Action issued in Japanese Application No. 2018-175762.

* cited by examiner

*Primary Examiner* — Neil R McLean
(74) *Attorney, Agent, or Firm* — Oliff PLC

(57) ABSTRACT

An information processing device includes an information processing device body, an extension device to be additionally connected to the information processing device body, and a combined information generator that generates combined information to be used for displaying, on one screen, information indicating a basic function of the information processing device body together with information indicating an extended function of the extension device when the extension device is connected to the information processing device body.

14 Claims, 6 Drawing Sheets

FIG. 2

| FUNCTION ITEM 1 | FUNCTION ITEM 2 | PROCESSING LOCATION |
|---|---|---|
| PRINTING | …… | …… |
| IMAGE READING | NORMAL MODE | INFORMATION PROCESSING DEVICE BODY |
|  | HIGH-COMPRESSION MODE | INFORMATION PROCESSING DEVICE BODY |
| COPYING | …… | …… |
| …… | …… | …… |

FIG. 3

| FUNCTION ITEM 1 | FUNCTION ITEM 2 | PROCESSING LOCATION |
|---|---|---|
| IMAGE READING | HIGH-COMPRESSION PDF | EXTENSION DEVICE |

FIG. 4

| FUNCTION ITEM 1 | FUNCTION ITEM 2 | PROCESSING LOCATION |
|---|---|---|
| PRINTING | ........ ........ | ........ ........ |
| IMAGE READING | NORMAL MODE<br>HIGH-COMPRESSION MODE<br>HIGH-COMPRESSION PDF | INFORMATION PROCESSING DEVICE BODY<br>INFORMATION PROCESSING DEVICE BODY<br>EXTENSION DEVICE |
| COPYING | ........ ........ | ........ ........ |
| ........ | ........ ........ | ........ ........ |

FIG. 6
BEFORE FUNCTION EXTENSION
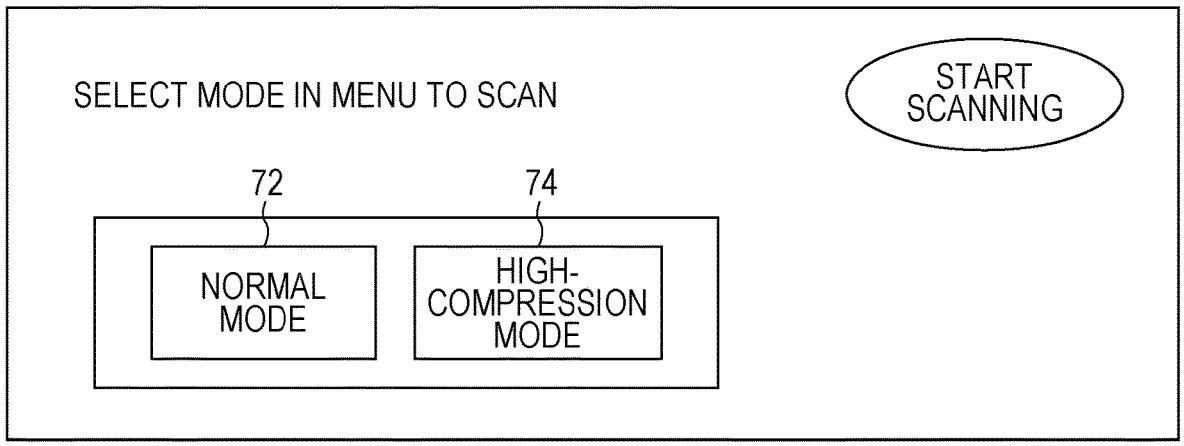
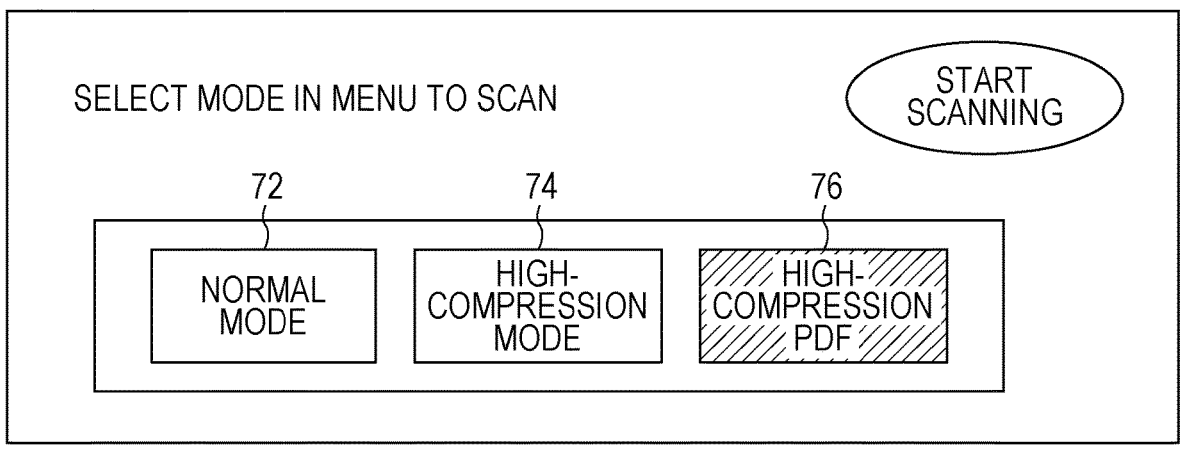

INFORMATION PROCESSING DEVICE, IMAGE FORMING DEVICE, AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-175762 filed Sep. 20, 2018.

BACKGROUND

(i) Technical Field

The present disclosure relates to an information processing device, an image forming device, and a non-transitory computer readable medium.

(ii) Related Art

Japanese Unexamined Patent Application Publication No. 2012-37928 discloses an information processing device connectable to an image forming device via a network. The information processing device includes a communication part that transmits and receives various types of data, a device function management part that discriminates a function of the image forming device based on processing capability information received by the communication part, an extended setting UI generation part that generates extended setting UI information depending on the function of the image forming device that is discriminated by the device function management part, an extended setting UI information control part that holds extended setting information received as a response to transmission of the extended setting UI information generated by the extended setting UI generation part to the image forming device, and a print job control part that generates printing processing data by performing image processing based on the contents of the extended setting information held by the extended setting UI information control part in response to a print job received from the image forming device.

SUMMARY

Aspects of non-limiting embodiments of the present disclosure relate to an information processing device, an image forming device, and a non-transitory computer readable medium storing a program, which are capable of displaying, when an extension device is connected, information indicating an extended function of the extension device on one screen together with information indicating a basic function.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing device comprising an information processing device body, an extension device to be additionally connected to the information processing device body, and a combined information generator that generates combined information to be used for displaying, on one screen, information indicating a basic function of the information processing device body together with information indicating an extended function of the extension device when the extension device is connected to the information processing device body.

The extension device is a computer that processes information and is connected to the information processing device body to extend the function thereof. The extended function encompasses not only a function that the information processing device body does not have but also a function that achieves higher speed or accuracy for the function of the information processing device body.

BRIEF DESCRIPTION OF THE DRAWINGS

Exemplary embodiments of the present disclosure will be described in detail based on the following figures, wherein:

FIG. 2 is a table illustrating basic function information according to the first exemplary embodiment of the present disclosure;

FIG. 3 is a table illustrating extended function information according to the first exemplary embodiment of the present disclosure;

FIG. 4 is a table illustrating combined information according to the first exemplary embodiment of the present disclosure;

FIG. 6 is a screen diagram illustrating a display example according to the first exemplary embodiment of the present disclosure.

DETAILED DESCRIPTION

Exemplary embodiments of the present disclosure are described in detail with reference to the drawings.

Figure 1:
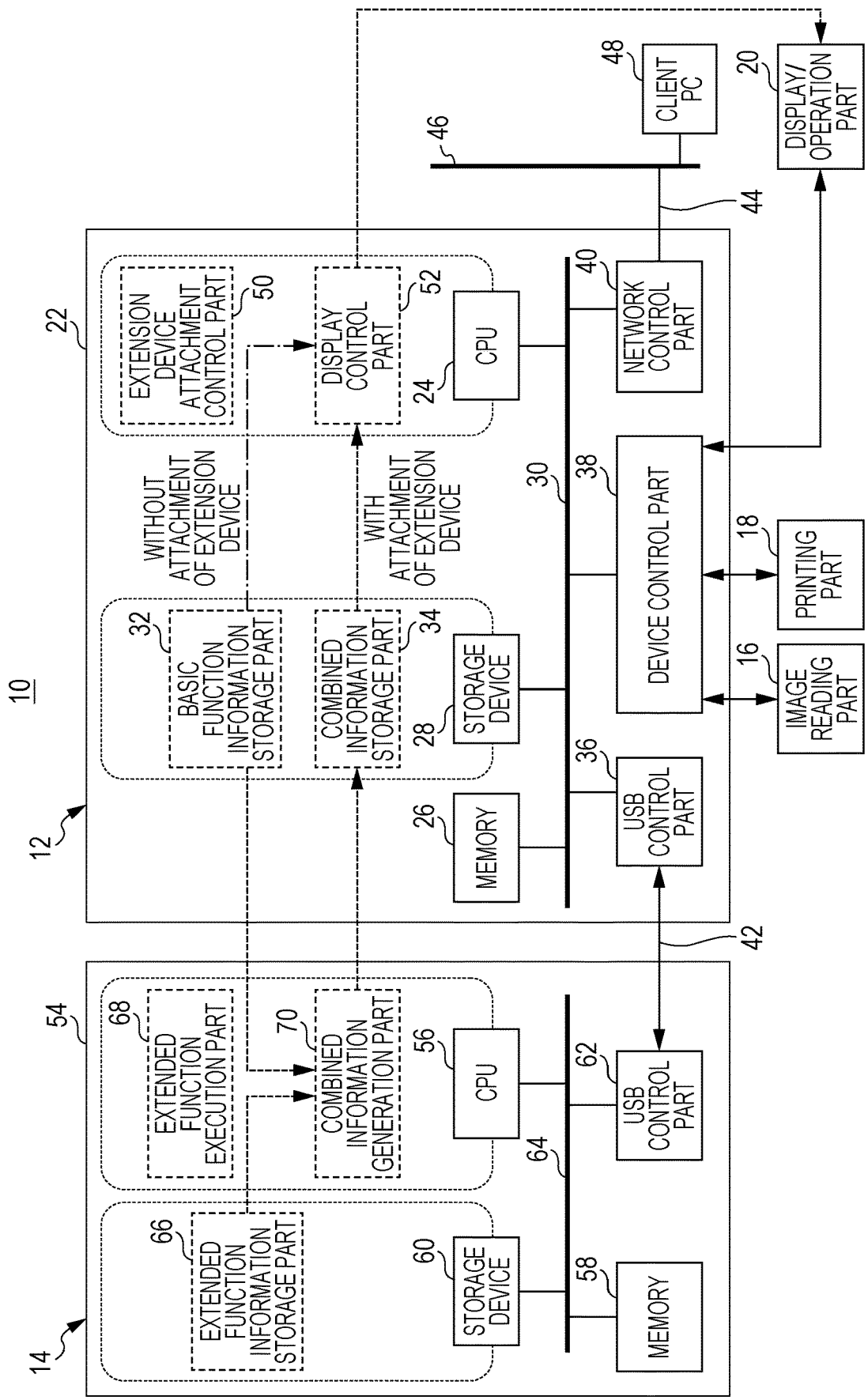
FIG. 1 is a block diagram illustrating an information processing device according to a first exemplary embodiment of the present disclosure.

FIG. 1 illustrates an information processing device 10 according to a first exemplary embodiment of the present disclosure.

For example, the information processing device 10 is an image forming device and includes an information processing device body 12 and an extension device 14. The information processing device body 12 includes an image reading part 16, a printing part 18, a display/operation part 20, and a main control part 22.

The image reading part 16 reads an image from a document. The printing part 18 prints the image on a recording medium. For example, the display/operation part 20 is a combination of a touch panel and a liquid crystal display to receive an input of operation information and display input buttons and a processing status.

The main control part 22 includes a CPU 24, a memory 26, and a storage device 28. The CPU 24, the memory 26, and the storage device 28 are connected together via a bus 30.

The CPU 24 executes predetermined processing based on a control program stored in the memory 26. The memory 26 is a volatile memory such as a random access memory (RAM). The storage device 28 is a non-volatile memory such as a flash memory or a hard disk drive to store necessary software and data. The storage device 28 includes a basic function information storage part 32 and a combined information storage part 34. The basic function information storage part 32 stores information related to basic functions of the information processing device body 12. The basic function is a function that may be processed in the information processing device body 12 and is typified by printing, image reading, or copying. As described later, the combined information storage part 34 stores combined information to be used for displaying the information related to the basic functions together with information related to extended functions.

A USB control part 36, a device control part 38, and a network control part 40 are connected to the bus 30. The USB is an abbreviation of Universal Serial Bus, which is a hot pluggable communication standard. A USB control part 62 of the extension device 14 described later is connected to the USB control part 36 via a USB cable 42.

The device control part 38 controls the image reading part 16, the printing part 18, and the display/operation part 20 described above. The network control part 40 is connected to a network 46 such as a local area network (LAN) via a network cable 44. For example, a client personal computer (PC) 48 is connected to the network 46.

The main control part 22 is provided with an extension device attachment control part 50 and a display control part 52 as functional components implemented by software. When it is detected that the extension device 14 is attached to the information processing device body 12, the extension device attachment control part 50 changes network table settings of the network control part 40 to allow data transmission to the extension device 14 via the network.

The extension device 14 is a computer such as a personal computer, a tablet computer, or a stick computer. The extension device 14 is connected to the information processing device body 12 to extend the functions of the information processing device 10.

The extension device 14 includes an additional control part 54. The additional control part 54 includes a CPU 56, a memory 58, a storage device 60, and the USB control part 62 that are connected together via a bus 64. When the extension device 14 is used alone, the CPU 56 executes predetermined processing based on a control program stored in the memory 58. The memory 58 is a volatile memory such as a RAM. The storage device 60 is a non-volatile memory such as a flash memory or a hard disk drive to store necessary software and data. In this exemplary embodiment, the storage device 60 is provided with an extended function information storage part 66. The extended function information storage part 66 stores the information related to the extended functions.

The CPU 56 of the extension device 14 has a higher processing speed than the CPU 24 of the information processing device body 12 because, for example, the clock frequency is higher.

The additional control part 54 is provided with an extended function execution part 68 and a combined information generation part 70 as functional components implemented by software. The extended functions include high-compression PDF, high-accuracy T/I separation (separation of a text and an image with high accuracy), high-quality image reading processing, OCR (abbreviation of Optical Character Reader, which is conversion of an image into characters by software), scaling of a displayed image, saving of read data, and service menu display and service selection (for example, display of a menu of services and selection of services on a different device by wireless). The high-compression PDF is processing of creating a PDF file by compressing data into, for example, about one-tenth of the data amount. The PDF is an abbreviation of Portable Document Format, which is a file format developed by Adobe.

The combined information generation part 70 generates combined information by combining the information related to the basic functions that is stored in the basic function information storage part 32 of the information processing device body 12 and the information related to the extended functions that is stored in the extended function information storage part 66 of the extension device 14. The combined information generated by the combined information generation part 70 is written into the combined information storage part 34 of the information processing device body 12. The display control part 52 reads the written combined information and generates a display screen. The display screen is transmitted to the device control part 38 and is displayed on the display/operation part 20.

FIG. 2 illustrates an example of the structure of the basic function information. The basic function information is divided into printing, image reading, copying, and the like as function items 1. Each function item 1 is divided into function items 2. For example, the function item 1 "image reading" is divided into a normal mode and a high-compression mode. Processing locations are linked to the two modes. In this case, each processing location is the information processing device body.

In the normal mode, an image is compressed by JPEG (compression method defined by International Organization for Standardization). In the high-compression mode, the compression ratio is increased compared with the normal mode to reduce the image data amount though the image quality decreases.

FIG. 3 illustrates an example of the structure of the extended function information. Similarly to the basic function information, the extended function information has a function item 1 and a function item 2 and a processing location is linked to the function item 2. In this case, the function item 1 is image reading, the function item 2 is the high-compression PDF described above, and the extension device is linked as a processing location of the high-compression PDF.

FIG. 4 illustrates an example of the structure of the combined information. The combined information is a combination of the basic function information and the extended function information. In this case, the high-compression PDF is added as the function item 2 for the function item 1 "image reading".

Figure 5:
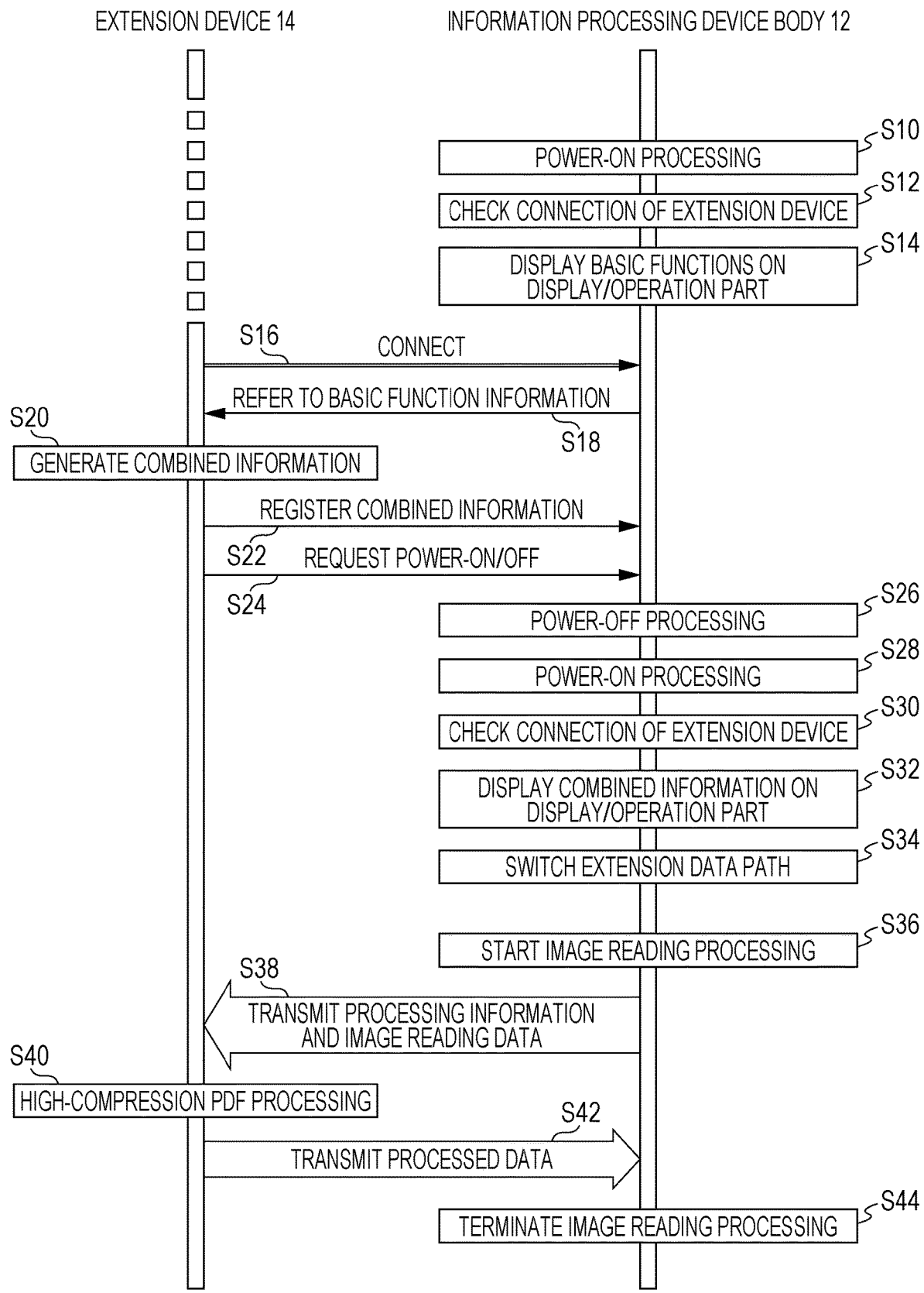
FIG. 5 is a sequence diagram illustrating an operation flow of the information processing device according to the first exemplary embodiment of the present disclosure.

FIG. 5 is a sequence diagram illustrating an operation flow between the information processing device body 12 and the extension device 14.

In Step S10, the information processing device body 12 performs power-ON processing. In Step S12, the information processing device body 12 checks whether the extension device 14 is connected. At this time, the extension device 14 is not connected. Therefore, in Step S14, the display control part 52 performs control so as to read the basic function information stored in the basic function information storage part 32 and display the basic functions on the display/operation part 20.

That is, the display control part 52 reads the basic function information illustrated in FIG. 2, generates a display image illustrated in FIG. 6, and displays the display image on the display/operation part 20 via the device control part 38. On one screen of the display/operation part 20, a normal mode selection button 72 and a high-compression mode selection button 74 are displayed and a user presses any button to select the normal mode or the high-compression mode.

In Step S16, the extension device 14 is connected to the information processing device body 12. In Step S18, the CPU 56 of the extension device 14 refers to the basic function information storage part 32 of the information processing device body 12 to acquire the basic function information. In Step S20, the CPU 56 of the extension device 14 causes the combined information generation part 70 to combine the basic function information and the extended function information to generate the combined information illustrated in FIG. 4.

In Step S22, the extension device 14 transmits the combined information to the information processing device body 12 to register the combined information in the combined information storage part 34 of the information processing device body 12.

In Step S24, the extension device 14 requests the information processing device body 12 to execute power-ON/OFF. In Step S26, the information processing device body 12 is powered OFF. In Step S28, the information processing device body 12 is powered ON to initialize the information processing device body 12. Thus, the storage contents of the storage device 28 become active.

In Step S30, the information processing device body 12 checks whether the extension device 14 is still connected. In this case, the extension device 14 is still connected and the operation flow proceeds to Step S32.

In Step S32, the CPU 24 of the information processing device body 12 reads the combined information stored in the combined information storage part 34 and the display control part 52 generates the display screen of the combined information as illustrated in FIG. 6 and displays the display screen on the display/operation part 20 via the device control part 38.

On the display screen of the display/operation part 20, a high-compression PDF selection button 76 is displayed in addition to the normal mode selection button 72 and the high-compression mode selection button 74. The high-compression PDF selection button 76 is displayed side by side with the normal mode selection button 72 and the high-compression mode selection button 74 and the user may select the high-compression PDF selection button 76 without distinction from the normal mode selection button 72 and the high-compression mode selection button 74.

The normal mode selection button 72 and the high-compression mode selection button 74 may be displayed vertically instead of being displayed side by side. The normal mode selection button 72 and the high-compression mode selection button 74 may be displayed in other ways instead of being displayed vertically or side by side.

When the high-compression PDF selection button 76 is selected, the information processing device body 12 switches a data path for extended function processing to the extension device 14 side in Step S34.

In Step S36, the information processing device body 12 starts image reading processing. In Step S38, the information processing device body 12 transmits processing information and image reading data to the extension device 14. In Step S40, the extension device 14 executes high-compression PDF processing for the transmitted image reading data based on the transmitted processing information. When the high-compression PDF processing is finished in Step S40, the extension device 14 transmits processed data to the information processing device body 12 in Step S42. In Step S44, the information processing device body 12 terminates the processing.

Figure 7:
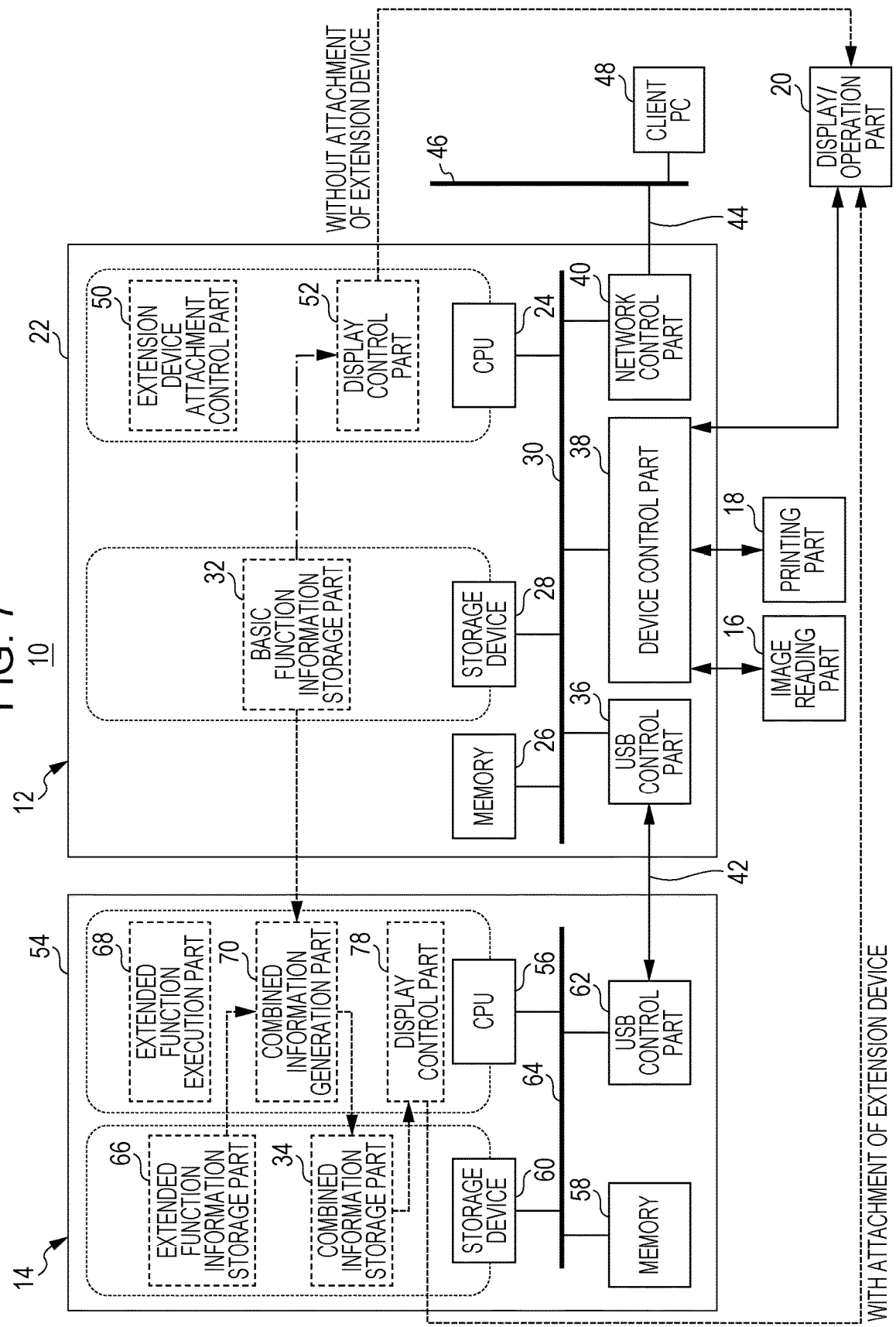
FIG. 7 is a block diagram illustrating an information processing device according to a second exemplary embodiment of the present disclosure.

FIG. 7 illustrates an information processing device 10 according to a second exemplary embodiment of the present disclosure.

In the second exemplary embodiment, the extension device 14 performs more processing compared with the first exemplary embodiment.

That is, the storage device 60 of the extension device 14 includes the combined information storage part 34 that stores the combined information. The combined information storage part 34 stores the combined information that is the combination of the basic function information and the extended function information. Further, the extension device 14 is provided with a display control part 78 implemented by software.

When the extension device 14 is not connected, the display control part 52 of the information processing device body 12 generates the display screen of the basic function information and displays the display screen on the display/operation part 20 via the device control part 38. When the extension device 14 is connected, the combined information generated by the combined information generation part 70 of the extension device 14 is stored in the combined information storage part 34 of the storage device 60 and is transmitted to the display control part 78 of the extension device 14. The display control part 78 of the extension device 14 generates the display screen and displays the display screen on the display/operation part 20 via the device control part 38 of the information processing device body 12.

In the second exemplary embodiment, the same parts as those in the first exemplary embodiment described above are represented by the same reference symbols in the figure to omit description thereof.

In the first exemplary embodiment and the second exemplary embodiment, the extension device 14 is connected to the information processing device body 12 via a hot pluggable cable but the connection is not limited thereto. The extension device 14 may be connected via a network or may be connected by wireless.

In the first exemplary embodiment and the second exemplary embodiment, the information related to the basic functions, the information related to the extended functions, and the combined information are displayed on the display/operation part 20 of the information processing device body 12 but the display is not limited thereto. Those pieces of information may be displayed on a dedicated display device. The extension device may be provided with a display device and those pieces of information may be displayed on the display device of the extension device. Those pieces of information may be displayed on the client PC 48 or the like via the network 46.

In the first exemplary embodiment and the second exemplary embodiment, the image forming device is described as an example of the information processing device but the information processing device is not limited thereto and may be a personal computer, a robot, or the like.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing device, comprising:
an information processing device body;
an extension device to be additionally connected to the information processing device body;
a processor configured to generate combined information to be used for displaying, on one screen, information indicating a basic function of the information processing device body together with information indicating an extended function of the extension device when the extension device is connected to the information processing device body; and
a display configured to display a user interface including a screen with the basic function when the extension device is not connected to the information processing device body and a modified version of the screen with the basic function and the extended function when the extension device is connected to the information processing device body without indicating that the extended function is provided by the extension device.

2. The information processing device according to claim 1, wherein the processor is in the information processing device body.

3. The information processing device according to claim 1, wherein the processor is in the extension device.

4. The information processing device according to claim 1, wherein the information processing device body comprises a display controller that controls a display device to display, on one screen, the combined information generated by the processor.

5. The information processing device according to claim 2, wherein the information processing device body comprises a display controller that controls a display device to display, on one screen, the combined information generated by the processor.

6. The information processing device according to claim 3, wherein the information processing device body comprises a display controller that controls a display device to display, on one screen, the combined information generated by the processor.

7. The information processing device according to claim 4, wherein the display controller performs control to display the information indicating the basic function and the information indicating by side.

8. The information processing device according to claim 5, wherein the display controller performs control to display the information indicating the basic function and the information indicating the extended function side by side.

9. The information processing device according to claim 6, wherein the display controller performs control to display the information indicating the basic function and the information indicating the extended function side by side.

10. The information processing device according to claim 1, wherein the extension device comprises a display controller that controls a display device to display, on one screen, the combined information generated by the processor.

11. The information processing device according to claim 2, wherein the extension device comprises a display controller that controls a display device to display, on one screen, the combined information generated by the processor.

12. The information processing device according to claim 3, wherein the extension device comprises a display controller that controls a display device to display, on one screen, the combined information generated by the processor.

13. An image forming device, comprising:
an image forming device body;
an extension device to be additionally connected to the image forming device body;
a processor configured to generate combined information to be used for displaying, on one screen, information indicating a basic function of the image forming device body together with information indicating an extended function of the extension device when the extension device is connected to the image forming device body; and
a display configured to display a user interface including a screen with the basic function when the extension device is not connected to the image forming device body and a modified version of the screen with the basic function and the extended function when the extension device is connected to the image forming device body without indicating that the extended function is provided by the extension device.

14. A non-transitory computer readable medium storing a program causing a computer to execute a process comprising:
determining whether an extension device is connected to an information processing device body;
generating combined information to be used for displaying, on one screen, information indicating a basic function of the information processing device body together with information indicating an extended function of the extension device when the extension device is connected to the information processing device body; and
displaying a user interface including a screen with the basic function when the extension device is not connected to the information processing device body and a modified version of the screen with the basic function and the extended function when the extension device is connected to the information processing device body without indicating that the extended function is provided by the extension device.

* * * * *